US006397655B1

(12) United States Patent
Stephenson

(10) Patent No.: US 6,397,655 B1
(45) Date of Patent: Jun. 4, 2002

(54) AUTO-CALIBRATION OF A SOLENOID OPERATED VALVE

(75) Inventor: Dwight Stephenson, Delafield, WI (US)

(73) Assignee: Husco International, Inc., Waukesha, WI (US)

(*) Notice: Subject to any disclaimer, the term of this patent is extended or adjusted under 35 U.S.C. 154(b) by 0 days.

(21) Appl. No.: 09/541,813

(22) Filed: Apr. 3, 2000

(51) Int. Cl.[7] .............................................. G01L 27/00

(52) U.S. Cl. ......................................... 73/1.72; 73/168

(58) Field of Search .................................. 73/168, 1.72

(56) References Cited

U.S. PATENT DOCUMENTS 4,690,003 A * 9/1987 McNennamy et al. ........ 73/168

4,759,224 A * 7/1988 Charbonneau et al. ........ 73/168

5,878,647 A * 3/1999 Wilke et al.

* cited by examiner

*Primary Examiner*—Robert Raevis

(74) *Attorney, Agent, or Firm*—George E. Haas; Quarles & Brady LLP

(57) ABSTRACT

Operation of an electrically operated valve is calibrated by applying a gradually increasing electric current to the valve. While that is occurring pressure at either the inlet or outlet of the valve is measured to detect when the valve opens. When the valve opens the level of the electric current then being applied to the valve is employed to determine an initial current level to use subsequently whenever the valve is to be opened.

11 Claims, 2 Drawing Sheets

AUTO-CALIBRATION OF A SOLENOID OPERATED VALVE

BACKGROUND OF THE INVENTION

The present invention relates to pilot operated proportional hydraulic valves which are electrically controlled, and particularly to calibrating the control of such valves.

The application of hydraulic fluid to an actuator, such as a cylinder and piston arrangement, can be controlled by a set of solenoid operated pilot valves. A pump supplies hydraulic fluid under pressure to an electro-hydraulic valve (EHV) assembly, such as the one described in U.S. Pat. No. 5,878,647. The EHV assembly includes a fluid distribution block on which four solenoid valves are mounted to control the flow of fluid to and from chambers of a hydraulic cylinder connected to the fluid distribution block. A first pair of the solenoid valves governs the fluid flow to and from the piston chamber of the cylinder, and a second pair of the solenoid valves controls the fluid flow to and from the rod chamber. By sending pressurized fluid into one cylinder chamber and draining fluid from the other chamber, the piston can be moved in one of two directions. The rate of flow into a chamber of the cylinder is varied by controlling the degree to which the associated supply valve is opened, which results in the piston moving at proportionally different speeds.

Solenoid operated pilot valves are well known for controlling the flow of hydraulic fluid and employ an electromagnetic coil which moves an armature in one direction to open a valve. The armature acts on a pilot poppet that controls the flow of fluid through a pilot passage in a main valve poppet. The amount that the valve opens is directly related to the magnitude of electric current applied to the electromagnetic coil, thereby enabling proportional control of the hydraulic fluid flow. A spring acts on the armature to close the valve when electric current is removed from the solenoid coil. An example of a solenoid operated pilot valve of this type is described in the aforementioned U.S. Patent.

Such proportional solenoid valves usually have a spring preload force that acts on the pilot poppet. As a consequence a substantial current level is required to produce an electromagnetic force that overcomes the spring force and produces opening movement of the pilot poppet. If the control circuit commences applying current to the valve from zero when the operator first moves a manual control device, that device must be moved a certain amount before sufficient current is applied to the electromagnetic coil to open the valve. This produces a dead band of wasted motion of the manual control device.

To overcome this dead band problem, control circuits have been designed to apply a predefined current level above zero upon initial movement of the control device. In other words as shown in FIG. 1, the current applied to the electromagnetic coil jumps from zero to that predefined initial current level $I_{INT}$ when the operator initially moves the control device from the off position. The predefined initial current level is set to produce a force on the armature of the solenoid that is slightly less than the spring preload force. Thus the valve does not open immediately when the control device is moved from the off position. As the control device continues to be moved the coil current increases causing pilot valve to open thereby producing a small flow through the valve. Eventually the coil current increases to a level $I_O$ at which the main valve poppet opens. This operation virtually eliminates the dead band of wasted operator motion. The difference between the initial current level $I_{INT}$ and the current level $I_O$ at which the main valve poppet opens is referred to an the "margin".

A problem in this operation arises due to relaxation of the spring preload force with age which results in the valve opening at a significantly lesser force produced by the electromagnetic coil, thus decreasing the margin. Such relaxation can result from fatigue of the valve spring, deformation of the pilot poppet-seat interface, or deformation of the main poppet-seat interface. In pressure compensated solenoid valves, changes in the compensation mechanism with age also produces relaxation of the spring preload force. When significant relaxation occurs, the valve may jump from a closed position to a substantial flow position when the initial current level is applied to the valve. This inhibits control at low flow rates.

SUMMARY OF THE INVENTION

The present invention provides a method for calibrating control of a fluid valve having an inlet, an outlet and an electrically operated actuator. When the fluid valve is to be opened, a predefined initial level of electric current is applied initially to the electrically operated actuator. The calibration involves applying pressurized fluid to the inlet of the electrically operated valve and applying an electric current at varying levels to the electrically operated actuator. The pressure at one of the inlet and the outlet is measured, thereby producing a pressure measurement which is employed to determine when the fluid valve opens. For example, opening of the valve is indicated when the rate of change of the measured pressure changes more than a given amount.

A difference between the electric current level which was being applied when the fluid valve opened and the predefined initial level then is calculated. The predefined initial level is changed in response to that difference. In the preferred embodiment of the invention, the predefined initial level is set to a fixed amount less than the level of the electric current which was being applied when the fluid valve opened. This calibration ensures that the initial level of current applied to open the valve will be a desired amount less that the current level at with the valve begins to open. Thus uniform operation of the valve occurs, even as the valve ages.

DETAILED DESCRIPTION OF THE INVENTION

Figure 2:
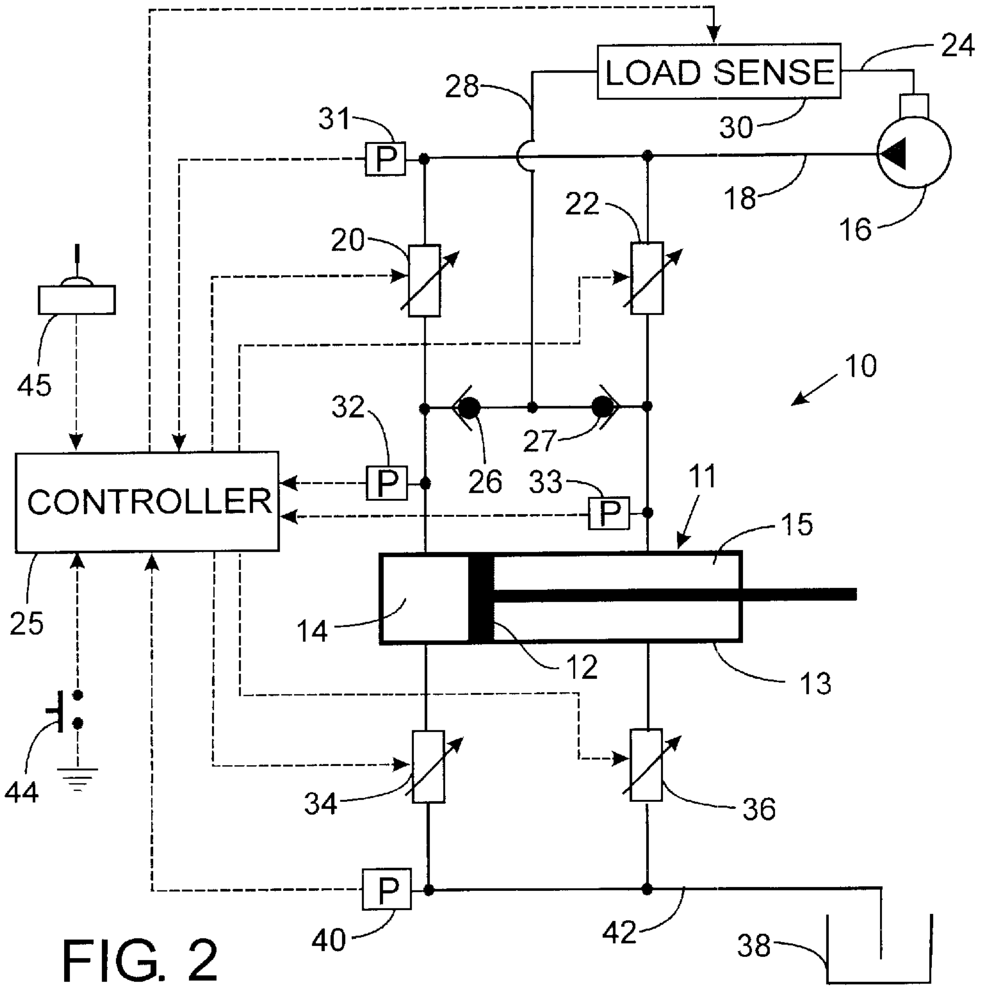
FIG. 2 is schematic diagram of a hydraulic system that incorporates the present invention.

With reference to FIG. 2, electro-hydraulic valves are utilized in a hydraulic system 10 to control bidirectional movement of an actuator 11. The actuator 11 may comprise a piston 12 within a cylinder 13 thereby defining a piston chamber 14 and a rod chamber 15 on opposite sides of the piston. Application of pressurized fluid to one or the other of those chambers 14 or 15 produces movement of the piston 12 within the cylinder. Such pressurized fluid is produced by a variable displacement pump 16 having an output connected to pump supply line 18.

The pump supply line 18 is coupled to the cylinder chambers 14 and 15 by a pair of inlet valves 20 and 22. Each inlet valve 20 and 22 is a solenoid operated, proportional valve and preferably has a pilot poppet, such as the type described in U.S. Pat. No. 5,878,647, the description of which is incorporated herein by reference. The output of the first inlet valve 20 is applied to the piston chamber 14 of the actuator 11. Similarly, the output of the second inlet valve 22 is applied to the rod chamber 15 of the actuator 11.

The variable displacement pump 16 is controlled by a signal at a control input 24. This signal is produced in response to the greatest load pressure from the cylinder chambers 14 and 15. For that purpose, each of the chambers 14 and 15 is connected by a separate check valve 26 and 27, respectively, to a load sense line 28, which at any given point in time carries a pressure signal corresponding to the greatest pressure in those cylinder chambers. That pressure signal is applied to a load sense circuit 30 that responds by producing the control signal at the control input 24 of the variable displacement pump 16. Alternatively, the check valve 26 and 27 and the load sense line 28 can be replaced by an electrical load sensing mechanism.

A first pressure sensor 31 is connected to the pump supply line 18 and provides a signal indicating the pressure in that line to a controller 25. The supply line from the inlet valves 20 and 22 to the cylinder chambers 14 and 15 also have separate pressure sensors 32 and 33, which send signals to the controller 25. Pressure sensors 32 and 33 provide input signals that respectively indicate the pressures in the piston and rod chambers 14 and 15.

The chambers 14 and 15 of actuator 11 are connected by third and fourth outlet valves 34 and 36 to a fluid reservoir, or tank 38, for the hydraulic system 10. Each outlet valve 34 and 36 is a solenoid operated, proportional valve of the same type as the inlet valves 20 and 22.

All the inlet and outlet valves are controlled by electrical signals from the controller 25 that are produced in response to the operator activating a manual control device, such as joystick 45. Depending upon the amount to which the operator moves the joystick 45, the controller 25 varies the magnitude of current applied to the respective valves which determines the degree to which the valve opens and thus the rate of fluid flow through the valves. The controller 25 is a microcomputer based device that executes a software program which governs the operation of the hydraulic system 10.

A fourth pressure sensor 40 provides an input signal to the controller 25 which indicates the pressure in a line 42 leading from the first and second outlet valves 34 and 36 to the fluid reservoir 38.

Periodically, the controller 25 calibrates the inlet and outlet valves 20, 22, 34 and 36 to ensure that the margin between the initial coil current and the current level at which the each valve opens remains at the desired value. Prior to initiating the calibration procedure, the operator places the member of the machine, which is controlled by the actuator 11, into a non-load bearing position. On a lift truck for example, the mast would be lowered completely in order to calibrate the hydraulic valves for the mast actuator.

Figure 3:
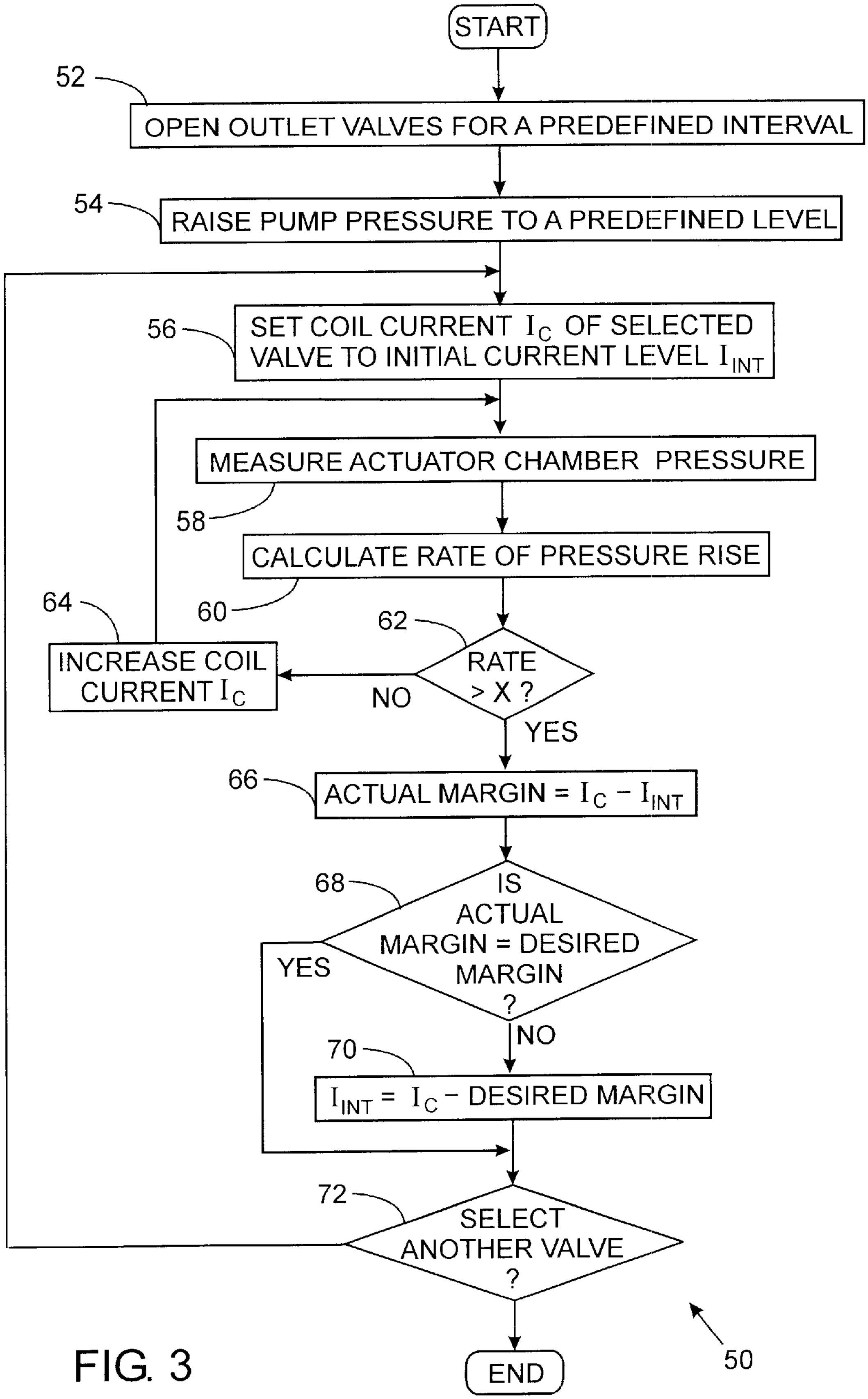
FIG. 3 is a flowchart of a software routine that is executed by a controller to recalibrate electrical operation of the proportional solenoid valve.

With the actuator 11 in the non-load bearing position, the operator activates a calibration switch 44 which sends a signal to the controller 25. In response to that calibration signal, the controller commences executing a software routine which implements the calibration procedure 50 depicted in FIG. 3. Calibration also can be activated automatically upon equipment shutdown when the actuators typically are placed into a non-load bearing position.

At the first step 52 of the calibration procedure 50, the controller 25 opens the outlet valves 34 and 36 for a predefined interval of time. That interval has a sufficient duration so that any fluid pressure trapped within the chambers 14 and 15 of the actuator 11 will be released by draining the hydraulic fluid to the system tank 38. The software execution then advances to step 54 where the controller 25 issues a command to the load sense circuit 30 to raise the output pressure of pump 16 to a predefined level. Then the electric current $I_C$ that is applied by the controller 25 to the electromagnetic coil of the first input valve 20 is set to the first current level at step 56. The first current level is less than the initial current level $I_{INT}$ in the graph of FIG. 1.

Figure 1:
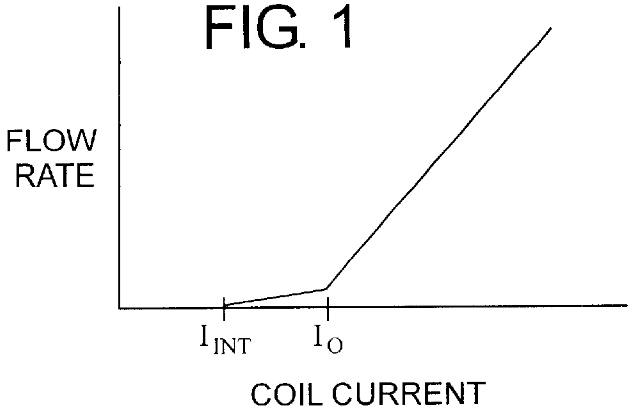
FIG. 1 is a graph showing the relationship between electric current applied to a proportional solenoid valve and fluid flow.

Referring again to FIGS. 2 and 3, the input pressure to the associated chamber 14 of the actuator 11 then is measured by the controller 25 reading the output signal from the pressure sensor 32 at step 58. At step 60 if there was a previous pressure measurement, the two measurements are utilized to calculate the rate of rise in pressure in the cylinder chamber 14. Because the pressure is measured at fixed time intervals, that rate of rise can be determined merely by calculating the difference between the most recent pressure measurement and the previous pressure measurement. The controller 25 then determines at step 62, whether the rate of pressure rise exceeds a given threshold amount which indicates that the main poppet of the first inlet valve 20 has opened. If that threshold has not been exceeded, indicating that the first inlet valve 20 remains closed, the program execution branches to step 64, where the coil current $I_C$ applied to the first inlet valve 20 is increased by a fixed amount. If the desired current margin between levels $I_{INT}$ and $I_O$ in FIG. 1 is 0.1 amps, for example, the coil current may be increased by 0.01 amps. That new current level that is applied to the electromagnetic coil of the first input valve 20 and steps 58–64 are repeated until the rate of pressure rise exceeds a predefined threshold value X at step 62.

When this occurs, the existing margin is calculated by the controller at step 66. Specifically, the margin is the coil current level $I_O$ at which the valve opened minus the level of the initial current $I_{INT}$. Then a determination is made at step 68 whether the existing margin differs from the desired margin by more than a given amount Y. This indicates that the actual margin has decreased significantly below the desired margin value. If such a decrease has occurred, the program execution advances to step 70 where the initial current level $I_{INT}$ is set equal to the present current level $I_C$, at which the valve opened, minus the desired margin. This new value for the initial current level $I_{INT}$ is stored in the memory of the controller 25, thereby recalibrating the operation for this first input valve 20.

A determination then is made at step 72 whether there is an additional inlet valve (e.g. 22) to calibrate. If so, that valve is selected and the process returns to step 56 where the process repeats for that other valve. When all of the valves have been calibrated the procedure 50 terminates.

A similar procedure can be utilized to calibrate the outlet valves 34 and 36. In this case, the inlet valves 20 and 22 are both opened and so as to apply pressure from the pump 18 through the chambers 14 and 15 of the actuator 11 to the inlets of both outlet valves 34 and 36. The inlet valves 20 and 22 are then closed to trap the pressure in the cylinder chambers. Next, the controller 25 applies current to the electromagnetic coil of the selected outlet valve and gradually increases that current while monitoring the pressure in the corresponding chamber 14 or 15 of the actuator 11. That pressure is indicated by the pressure sensor 32 or 33 associated with that cylinder chamber.

When the selected output valve 34 or 36 opens the associated pressure drops significantly. When that occurs the current $I_C$ that is being applied to the electromagnetic coil of the valve corresponds to the current level $I_O$ at which the valve opens. That current level $I_C$ along with the initial current $I_{INT}$ for the outlet valve then are used as previously described to determine whether the current margin should be reset.

What is claimed is:

1. A method for calibrating control of a fluid valve having an inlet, an outlet and an electrically operated actuator, wherein when the fluid valve is to be opened a predefined initial level of electric current is applied initially to the electrically operated actuator, said method comprising:

applying pressurized fluid to the inlet of the fluid valve;

applying an electric current at varying levels to the electrically operated actuator;

measuring pressure at one of the inlet and outlet to produce a pressure measurement;

determining from the pressure measurement when the fluid valve opens;

determining a difference between a level of the electric current which was being applied when the fluid valve opened and the predefined initial level; and changing the predefined initial level, in response to the difference.

2. The method as recited in claim 1 wherein measuring pressure comprises measuring pressure at the outlet when the fluid valve controls flow of fluid to an actuator.

3. The method as recited in claim 1 wherein measuring pressure comprises measuring pressure at the inlet when the fluid valve controls flow of fluid from an actuator.

4. The method as recited in claim 1 wherein applying an electric current at varying levels comprises applying a predetermined current level to the electrically operated actuator, and occasionally increasing the electric current until a determination is made that the fluid valve is open.

5. The method as recited in claim 1 wherein determining from the pressure measurement when the fluid valve opens comprises determining when a given rate of change in the pressure occurs.

6. The method as recited in claim 1 wherein changing the predefined initial level comprises setting the predefined initial level to a fixed amount less than the level of the electric current which was being applied when the fluid valve opened.

7. A method for calibrating control of a fluid valve having an inlet, an outlet and an electrically operated actuator, wherein when the fluid valve is to be opened a predefined initial level of electric current is applied initially to the electrically operated actuator, said method comprising:

(a) applying pressurized fluid to the inlet of the fluid valve;

(b) applying a electric current at a predetermined level to the electrically operated actuator;

(c) measuring pressure at one of the inlet and outlet to produce a pressure measurement;

(d) determining from the pressure measurement whether the fluid valve is open or closed;

(e) if the fluid valve is determined to be closed, increasing the electric current;

(f) repeating steps (c) through (e) until the fluid valve is determined to be open;

(g) upon determining that the fluid valve is open, determining a difference between the electric current then being applied to the electrically operated actuator and the predefined initial level;

(h) determining whether the difference is greater than a predefined amount; and (i) when the difference is greater than the predefined amount, changing the predefined initial level.

8. The method as recited in claim 7 wherein measuring pressure comprises measuring pressure at the inlet when the fluid valve controls flow of fluid to an actuator.

9. The method as recited in claim 7 wherein measuring pressure comprises measuring pressure at the inlet when the fluid valve controls flow of fluid from an actuator.

10. The method as recited in claim 7 wherein determining from the pressure measurement whether the fluid valve is open or closed comprises determining that the fluid valve is open when a given rate of change in the pressure occurs.

11. The method as recited in claim 7 wherein changing the predefined initial level comprises setting the predefined initial level to a fixed amount less than the level of the electric current which was being applied when the fluid valve opened.

* * * * *